E. H. FORD.
ADJUSTABLE PIPE COUPLING.
APPLICATION FILED NOV. 20, 1918.
1,301,244.
Patented Apr. 22, 1919.
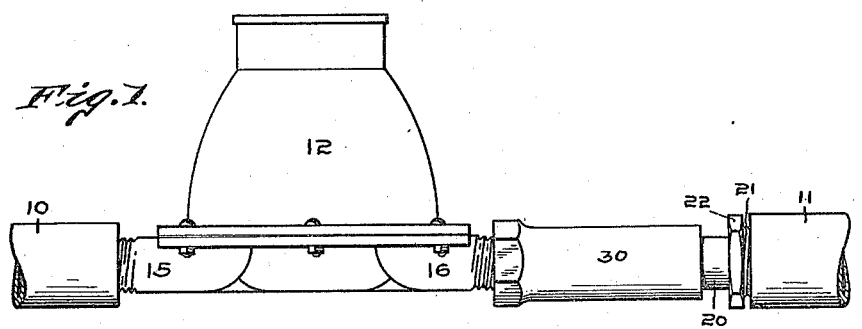
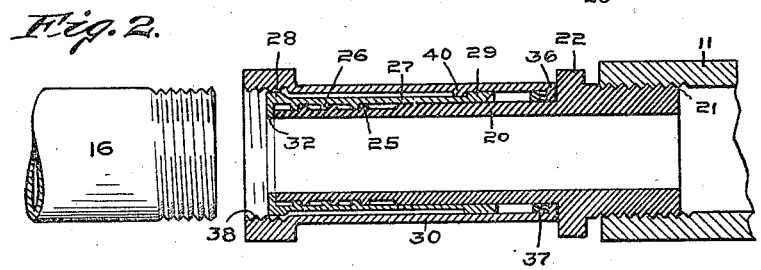
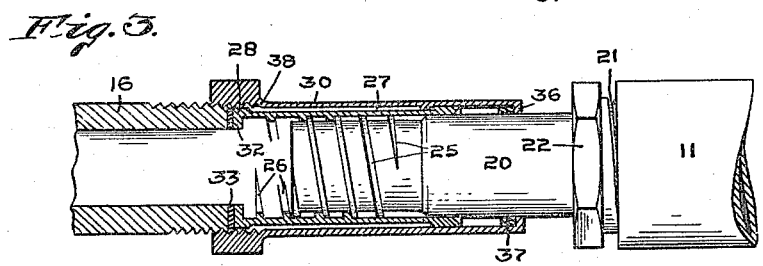
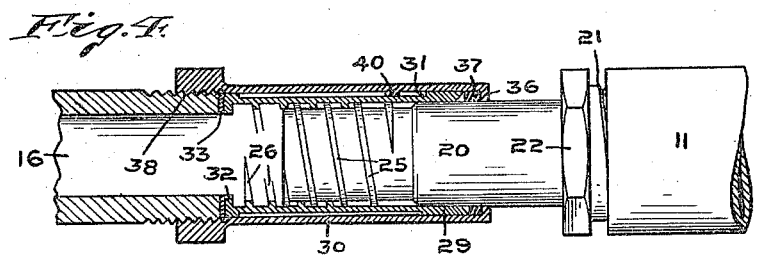
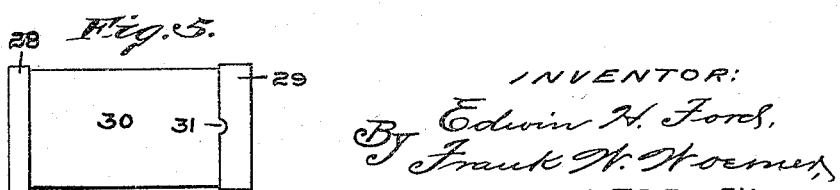
INVENTOR:
Edwin H. Ford,
By Frank W. Hoerner,
ATTORNEY.

UNITED STATES PATENT OFFICE.

EDWIN H. FORD, OF WABASH, INDIANA, ASSIGNOR TO FORD METER BOX COMPANY, OF WABASH, INDIANA, A CORPORATION.

ADJUSTABLE PIPE-COUPLING.

1,301,244.    Specification of Letters Patent.    Patented Apr. 22, 1919.

Application filed November 20, 1918. Serial No. 263,357.

*To all whom it may concern:*

Be it known that I, EDWIN H. FORD, a citizen of the United States, residing at Wabash, in the county of Wabash and State of Indiana, have invented certain new and useful Improvements in Adjustable Pipe-Couplings, of which the following is a specification.

This invention relates to certain means for connecting water meters in service pipe lines; and one of the objects of the invention consists in the provision of means of the above character whereby meter-openings in water supply pipe lines can be easily and quickly enlarged and reduced in size to accommodate meters of different lengths.

A further object of the invention consists in the provision of certain means for connecting and disconnecting water meters of different lengths from water supply pipe lines which is simple in construction, efficient in operation and cheap to manufacture.

I accomplish the above objects of the invention, and such others as may appear from a perusal of the specification and claims, by means of the construction illustrated in the accompanying drawings, forming a part hereof, in which—

Figure 1 is a side elevation of a conventional style of a water meter arranged within a water supply pipe line, showing my invention in operation. Fig. 2 is a central longitudinal sectional view through the meter connection, on a full sized scale. Fig. 3 is a view partly in longitudinal section and partly in elevation of the meter connection showing its initial adjustment before being connected to the spud of the meter. Fig. 4 is a view similar to Fig. 3 except that the meter connection is shown as occupying a normal operative position. Fig. 5 is an outer view of the cylinder of the meter connection.

As a preliminary statement it may be mentioned that all water meters must be removed from water supply pipe lines occasionally when they become fouled through the accumulation of sediment or other foreign matter which interferes with the proper working of the internal mechanism, and as meters vary slightly in length, especially between meters of different manufacture, provision must be made for accommodating these meters and for effecting proper connection with them, and for accomplishing the above result constitutes one of the chief features of the present case.

Referring to the drawings, 10 and 11 represent the opposing ends of the service pipes between which a meter 12 is to be fitted. In placing meter 12 into position the meter-spud 15 is screwed into a proper pipe-union on the end of service pipe 10, and at the conclusion of this operation it may be found that meter-spud 16 is not long enough (as shown in Fig. 2) to admit of proper connection being made with the end of service pipe 11. To remedy a condition of this character I provide a suitable coupling comprising a tube 20 which is provided along part of its surface with the external threads 21 adapted to be threaded into service pipe 11, and an integral nut 22 is provided to form a seat for the wrench in properly seating tube 20. Tube 20 is further provided with the square faced threads 25 which coöperate with corresponding threads 26 on the interior wall of a cylinder 27, so that in rotating said cylinder the latter may be moved longitudinally of said tube. The external surface of cylinder 27 is dressed down to provide the annular shoulders 28 and 29, the diameter of these shoulders snugly fitting the internal diameter of a sleeve 30 which surrounds both cylinder 27 and tube 20, and cut into the inner face of the shoulder 29 is a recess (Fig. 5), and the object of this recess will be hereinafter described. One end of cylinder 27 is also provided with an inwardly turned flange 32 which forms a seat for a gasket 33.

As heretofore stated, tube 20 and cylinder 27 are surrounded by a sleeve 30, and one end of this sleeve is provided with an annular inturned flange 36 which snugly fits the outer diameter of tube 20, and flange 36 forms a seat for a gasket 37 which prevents the escape of water between the edge of flange 36 and the surface of tube 20. The opposite end of sleeve 30 has internal threads 38 for effecting a coupling with the adjacent meter-spud 16, and sleeve 30 is further provided with an internally located lug or pin 40 which may be moved into and out of engagement with recess 31 in cylinder 27 by slightly moving said sleeve longitudinally and independently of cylinder 27, this independent longitudinal movement of the sleeve being rendered possible by spacing threads 25 and 26 a considerable distance apart as shown.

With the above description in mind, it will be observed that when a meter is placed into position between the adjacent ends of a service pipe line and an intervening space remains as shown in Fig. 2, sleeve 30 is moved longitudinally until pin 40 rests within recess 31, and then by rotating sleeve 30 cylinder 27 is caused to rotate therewith and through the medium of threads 25 and 26 the threaded end 38 of sleeve 30 may be brought into contact with meter-spud 16, as shown in Fig. 3. At the conclusion of the latter operation, sleeve 30 is susceptible of being moved independently and longitudinally of cylinder 27, as heretofore described by the spacing of threads 25 and 26, to disengage pin 40 from recess 31, after which independent movement of rotation may be imparted to sleeve 30 for threading the threaded end 38 of the latter on to meter-spud 16. As sleeve 30 is threaded on meter-spud 16 a water tight joint between the spud and cylinder 27 is effected through the medium of the gasket 33.

By means of the above described construction, it will be seen that water meters of different lengths can be accommodated within prescribed limits in an opening in a service pipe line.

Having thus fully described my said invention, what I desire to secure by Letters Patent, is—

1. A device of the character described comprising a tube for connecting the end of a service pipe, a revoluble cylinder arranged on said tube, means for moving said cylinder longitudinally when rotated for changing the length of the device, a sleeve forming a connection with a meter-spud surrounding said sleeve and having independent longitudinal and rotational travel of said cylinder, and means for temporarily connecting and for simultaneously rotating the sleeve and cylinder at the will of the operator.

2. A device of the character described comprising a tube for connecting the end of a service pipe, threads on the external surface of said tube, a cylinder surrounding said tube, threads arranged on the internal wall of said cylinder and operatively engaging the threads on the tube for moving said cylinder longitudinally when rotated, a sleeve arranged around said cylinder and having independent longitudinal and rotational travel of said cylinder, threads in the end of the sleeve to form a connection with a meter-spud, and means interposed between the sleeve and cylinder for temporarily connecting and simultaneously rotating the sleeve and cylinder at the will of the operator.

3. A device of the character described comprising a tube for connecting the end of a service pipe, threads on the external surface of said tube, a cylinder surrounding said tube and having a notch in its outer surface, threads arranged on the internal wall of the cylinder and operatively engaging the threads on the tube for moving said cylinder longitudinally when rotated, a sleeve arranged around said cylinder and having longitudinal and rotational travel independently of said cylinder, and a pin carried by said sleeve and adapted to engage the notch in the cylinder for simultaneously rotating said sleeve and cylinder at the will of the operator.

In witness whereof, I have hereunto set my hand and seal at Wabash, Indiana, this 13th day of November, A. D. one thousand nine hundred and eighteen.

EDWIN H. FORD. [L. S.]

Copies of this patent may be obtained for five cents each, by addressing the "Commissioner of Patents, Washington, D. C."